(12) United States Patent
Bechtler et al.

(10) Patent No.: US 8,467,929 B2
(45) Date of Patent: Jun. 18, 2013

(54) GOOD CHECKING FOR VEHICLE WHEEL SPEED SENSORS

(75) Inventors: Henrik Bechtler, Stuttgart (DE); Ravi Bhadange, Farmington, MI (US); Nachiket Patil, Farmington Hills, MI (US); Takeshi Tokonaga, Yokohama (JP); Stefan Mallmann, Lauffen (DE); Michael Schwab, Korntal (DE); Dietmar Stapel, Sendenhorst (DE); Willy Klier, Bloomfield Hills, MI (US); Joerg Eesmann, Rheine (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 12/860,362

(22) Filed: Aug. 20, 2010

(65) Prior Publication Data

US 2011/0066319 A1      Mar. 17, 2011

Related U.S. Application Data

(60) Provisional application No. 61/236,393, filed on Aug. 24, 2009.

(51) Int. Cl.
| G01P 21/00 | (2006.01) |
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |

(52) U.S. Cl.
USPC ....... 701/30.3; 701/29.7; 701/30.1; 701/30.4; 701/31.3; 701/33.4; 701/33.5; 701/33.6; 701/33.7; 701/34.1; 701/34.4; 701/29.1; 701/29.2; 73/1.37

(58) Field of Classification Search
USPC .......... 303/122.03; 701/29.7–31.7, 33.4–34.4
See application file for complete search history.

(56) References Cited

U.S. PATENT DOCUMENTS 3,798,596 A      3/1974 Sumiyoshi et al.
3,803,425 A  *   4/1974 Carp ............................... 327/82
(Continued)

FOREIGN PATENT DOCUMENTS

EP          1227019          7/2002

OTHER PUBLICATIONS

Harland, David M., Lorenz, Ralph D., "Space Systems Failures", Springer Praxis Books, 2005, Part Two, 211-226, available at http://www.springerlink.com/content/n886138036412186/.*

(Continued)

*Primary Examiner* — Ryan Zeender
*Assistant Examiner* — Allen Chein
(74) *Attorney, Agent, or Firm* — Michael Best & Friedrich LLP

(57) ABSTRACT

A controller for determining whether a previously-detected vehicle wheel speed sensor malfunction still exists. The controller includes an electronic, non-volatile memory, and an electronic processing unit connected to the electronic, non-volatile memory. The electronic processing module includes a malfunction monitoring module, a failure handling module, and a signal checking module. The malfunction monitoring module monitors the operation of at least one wheel speed sensor and generates a fault signal when the at least one sensor malfunctions. The failure handling module causes drive cycle information and the fault information to be stored in the electronic, non-volatile memory. The signal checking module performs a signal check on information from the at least one wheel speed sensor. A tell-tale indicator is deactivated and/or a vehicle control system resumes normal operation if the wheel speed sensor passes the signal check.

15 Claims, 6 Drawing Sheets

U.S. PATENT DOCUMENTS

| | | | |
|---|---|---|---|
| 3,916,375 A | | 10/1975 | Sumiyoshi et al. |
| 4,219,244 A | | 8/1980 | Griner et al. |
| 4,233,599 A | * | 11/1980 | Brearley ............... 340/679 |
| 4,234,866 A | | 11/1980 | Kuroda et al. |
| 4,648,662 A | * | 3/1987 | Fennel et al. .......... 303/122.04 |
| 4,839,811 A | | 6/1989 | Kanegae et al. |
| 4,886,291 A | | 12/1989 | Okamoto |
| 4,934,474 A | | 6/1990 | Sugasawa |
| 4,953,652 A | | 9/1990 | Ohmura et al. |
| 4,996,657 A | | 2/1991 | Shiraishi et al. |
| 5,008,823 A | | 4/1991 | Takahashi |
| 5,014,801 A | | 5/1991 | Hirose |
| 5,200,911 A | | 4/1993 | Ishikawa et al. |
| 5,201,380 A | | 4/1993 | Callahan |
| 5,271,475 A | | 12/1993 | Takeshita |
| 5,282,135 A | | 1/1994 | Sato et al. |
| 5,283,740 A | | 2/1994 | Sato et al. |
| 5,305,723 A | * | 4/1994 | Kadota ............... 123/479 |
| 5,357,141 A | * | 10/1994 | Nitschke et al. .......... 307/10.1 |
| 5,448,480 A | | 9/1995 | Rauner et al. |
| 5,457,632 A | | 10/1995 | Tagawa et al. |
| 5,481,906 A | | 1/1996 | Nagayoshi et al. |
| 5,572,670 A | | 11/1996 | Puckett |
| 5,636,121 A | | 6/1997 | Tsuyama et al. |
| 5,671,981 A | | 9/1997 | Sasaki et al. |
| 5,710,704 A | | 1/1998 | Graber |
| 5,928,110 A | | 7/1999 | Vornehm et al. |
| 6,035,693 A | | 3/2000 | Horiuchi |
| 6,134,491 A | | 10/2000 | Kawagoe et al. |
| 6,144,904 A | | 11/2000 | Tseng |
| 6,198,988 B1 | | 3/2001 | Tseng |
| 6,212,465 B1 | | 4/2001 | Sielagoski et al. |
| 6,292,733 B1 | | 9/2001 | Sugiyama et al. |
| 6,301,536 B1 | | 10/2001 | Vaessen et al. |
| 6,305,760 B1 | | 10/2001 | Otake |
| 6,354,607 B1 | | 3/2002 | Kawashima et al. |
| 6,408,229 B1 | | 6/2002 | Loudon et al. |
| 6,427,102 B1 | | 7/2002 | Ding |
| 6,491,357 B2 | | 12/2002 | Holst |
| 6,502,025 B1 | | 12/2002 | Kempen |
| 6,519,515 B1 | | 2/2003 | Baumann et al. |
| 6,577,948 B1 | | 6/2003 | Skellenger et al. |
| 6,682,153 B2 | | 1/2004 | Okai |
| 6,834,221 B2 | | 12/2004 | Jäger et al. |
| 7,057,503 B2 | * | 6/2006 | Watson ............... 340/440 |
| 7,058,490 B2 | | 6/2006 | Kim |
| 7,085,642 B2 | | 8/2006 | Samuel et al. |
| 7,191,041 B2 | | 3/2007 | von Schwertfuehrer et al. |
| 7,200,524 B2 | | 4/2007 | Kang et al. |
| 7,286,083 B2 | * | 10/2007 | Xie et al. ............ 342/357.58 |
| 7,823,986 B2 | | 11/2010 | Ruffer et al. |
| 8,155,823 B2 | | 4/2012 | Itoh |
| 8,159,945 B2 | | 4/2012 | Muro et al. |
| 8,260,516 B2 | | 9/2012 | Bechtler et al. |
| 2001/0044688 A1 | | 11/2001 | Okita et al. |
| 2001/0051845 A1 | | 12/2001 | Itoh |
| 2002/0075137 A1 | | 6/2002 | Hofbeck et al. |
| 2002/0101115 A1 | * | 8/2002 | Holst ............... 303/122.03 |
| 2002/0113587 A1 | * | 8/2002 | Kim ............... 324/210 |
| 2002/0189889 A1 | | 12/2002 | Demerly |
| 2003/0109939 A1 | | 6/2003 | Burgdorf et al. |
| 2003/0149540 A1 | * | 8/2003 | Kachel et al. ............ 702/142 |
| 2004/0026148 A1 | | 2/2004 | Matsuno |
| 2004/0030474 A1 | | 2/2004 | Samuel et al. |
| 2004/0243287 A1 | | 12/2004 | Yanaka et al. |
| 2005/0131602 A1 | | 6/2005 | Souda |
| 2005/0228546 A1 | | 10/2005 | Naik et al. |
| 2006/0173584 A1 | | 8/2006 | Einig et al. |
| 2006/0181066 A1 | | 8/2006 | Andres et al. |
| 2007/0129871 A1 | | 6/2007 | Post, II et al. |
| 2007/0250183 A1 | | 10/2007 | Howell et al. |
| 2007/0279207 A1 | | 12/2007 | Clark et al. |
| 2007/0282558 A1 | | 12/2007 | Sagisaka |
| 2008/0097671 A1 | | 4/2008 | Kojo et al. |
| 2008/0176122 A1 | | 7/2008 | Wake et al. |
| 2008/0183350 A1 | | 7/2008 | Noguchi |
| 2008/0195275 A1 | | 8/2008 | Kojo et al. |
| 2009/0055033 A1 | | 2/2009 | Gansler et al. |
| 2009/0069978 A1 | | 3/2009 | Inage |
| 2009/0164059 A1 | | 6/2009 | Takeda |
| 2010/0014302 A1 | * | 1/2010 | Okumura et al. ............ 362/466 |
| 2010/0138105 A1 | | 6/2010 | Shibasaki et al. |
| 2010/0269500 A1 | | 10/2010 | Ruffer et al. |
| 2010/0274436 A1 | | 10/2010 | Kodaka et al. |
| 2011/0066320 A1 | | 3/2011 | Bechtler et al. |
| 2011/0066321 A1 | | 3/2011 | Bechtler et al. |
| 2011/0068913 A1 | | 3/2011 | Bechtler et al. |
| 2011/0071723 A1 | | 3/2011 | Bechtler et al. |
| 2011/0071726 A1 | | 3/2011 | Bechtler et al. |
| 2011/0071727 A1 | | 3/2011 | Bechtler et al. |

OTHER PUBLICATIONS

EP10173774 European Search Report dated Nov. 30, 2010, 5 pages.
Office Action from the United States Patent and Trademark Office for U.S. Appl. No. 12/860,370 dated Jul. 5, 2012 (21 pages).
Office Action from the United States Patent and Trademark Office for U.S. Appl. No. 12/860,376 dated Aug. 3, 2012 (24 pages).
Notice of Allowance from the United States Patent and Trademark Office for U.S. Appl. No. 12/860,389 dated May 15, 2012 (8 pages).
Office Action from the United States Patent and Trademark Office for U.S. Appl. No. 12/860,407 dated Sep. 14, 2012 (18 pages).
Office Action from the United States Patent and Trademark Office for U.S. Appl. No. 12/860,418 dated Jul. 5, 2012 (23 pages).

* cited by examiner

GOOD CHECKING FOR VEHICLE WHEEL SPEED SENSORS

RELATED APPLICATION

The present application claims the benefit of prior filed co-pending U.S. Provisional Patent Application No. 61/236,393 filed on Aug. 24, 2009, the entire content of which is hereby incorporated by reference.

This application is related to the following United States Patent Applications: U.S. patent application Ser. No. 12/860,370, filed on Aug. 20, 2010 and entitled GOOD CHECKING FOR VEHICLE LONGITUDINAL ACCELERATION SENSOR; and U.S. patent application Ser. No. 12/860,376, filed on Aug. 20, 2010 and entitled GOOD CHECKING FOR VEHICLE LATERAL ACCELERATION SENSOR; and U.S. patent application Ser. No. 12/860,389, filed on Aug. 20, 2010 and entitled GOOD CHECKING FOR VEHICLE BRAKE LIGHT SWITCH; and U.S. patent application Ser. No. 12/860,396, filed on Aug. 20, 2010 and entitled GOOD CHECKING FOR VEHICLE PRESSURE SENSOR; and U.S. patent application Ser. No. 12/860,407, filed on Aug. 20, 2010 and entitled GOOD CHECKING FOR VEHICLE STEERING ANGLE SENSOR; and U.S. patent application Ser. No. 12/860,418, filed on Aug. 20, 2010 and entitled GOOD CHECKING FOR VEHICLE YAW RATE SENSOR.

BACKGROUND

Modern vehicles include computer systems for controlling engine emissions, vehicle braking, and a variety of other items. Each of these systems requires data in order to function, such as oxygen level data for controlling engine emissions and wheel speed data for controlling braking. This data is generally supplied by sensors located throughout the vehicle. To ensure the integrity of the data provided by the sensors, controllers perform malfunction testing on the sensors (or the signals or data the sensors provide). If a sensor malfunction is detected (e.g., there is an error in the sensor output or sensor data), a warning light or similar indicator can be activated.

SUMMARY

While current vehicle systems are designed to monitor the functioning or operation of vehicle sensors and determine when a sensor malfunction occurs, such systems lack, at least in general, robust abilities for determining when the sensor malfunction ends. For example, a sensor malfunction might be caused by a powerful source of electromagnetic interference ("EMI"). Such a circumstance might occur if a vehicle passes near an electrical power generation plant, a radar or broadcast installation, or similar location. Once the vehicle moves outside the range of the EMI, the output from the sensor might return to within an acceptable range. However, in many vehicles, once a sensor malfunction occurs, the only way in which the malfunction or error may be cleared is to have a mechanic or technician access the system, check its operation, and perform an act that resets the system or otherwise removes the error.

A check of the sensor signal based on a re-detection by the failure monitoring function can be used as a mechanism to determine if a sensor has returned to normal operation. However, "good checking" is more than this. In general, malfunction monitoring functions are designed to avoid misdetection. On the other hand, "good check" functions are, in general, designed to avoid a false good check, i.e., a good check function has smaller tolerances for deviations and fewer conditions on the driving situation to perform the evaluation. Or, in other words, the tolerances and conditions used in good checking are different than those used to detect a malfunction.

Embodiments of the invention provide a mechanism for automatically determining whether a malfunctioning sensor has returned to a normal or acceptable operating range. In the parlance of the inventors, embodiments of the invention perform a "good check" on the sensor to determine whether the sensor has returned to normal or acceptable operation after a malfunction has been detected. When a previously-malfunctioning sensor passes the "good check," warning lights (or tell-tale) indicators are shut off and systems that relied upon information from the malfunctioning sensor return to normal operation.

In one embodiment, the invention provides a controller for determining whether a previously-detected vehicle wheel speed sensor malfunction still exists. The controller includes an electronic, non-volatile memory, and an electronic processing unit connected to the electronic, non-volatile memory. The electronic processing module includes a malfunction monitoring module, a failure handling module, and a signal checking module. The malfunction monitoring module monitors the operation of at least one vehicle sensor and generates a fault signal when the at least one sensor malfunctions. The fault signal contains fault information and causes a tell-tale indicator to be activated and/or a vehicle control system to modify its operation from a first operating state to a second state. The failure handling module causes drive cycle information and the fault information to be stored in the electronic, non-volatile memory. The signal checking module performs a signal check on information from the at least one sensor. The signal check includes retrieving drive cycle information for a wheel speed sensor from the electronic, non-volatile memory and comparing an output of the wheel speed sensor to a pre-determined range. If the output of the wheel speed sensor is within the pre-determined range for a pre-determined amount of time, the wheel speed sensor passes the signal check. If the wheel speed sensor passes the signal check, the controller generates a reset signal, the reset signal causes the tell-tale indicator to be deactivated and/or the vehicle control system to resume operation in the first operating state.

In some embodiments, the controller is mounted in a vehicle. The previously-detected vehicle wheel speed sensor malfunction is one of an implausible sensitivity of the wheel speed sensor, an interference of the wheel speed sensor, and a stuck signal received from the wheel speed sensor. The wheel speed sensor is one of a plurality of wheel speed sensors and the controller compares a speed detected by each of the plurality of wheel speed sensors, the controller determining that a wheel speed sensor fault still exists if the difference between the fastest speed detected by one of the plurality of wheel speed sensors and the slowest speed detected by one of the plurality of wheel speed sensors exceeds a threshold. The controller checks if the difference between the fastest speed detected by one of the plurality of wheel speed sensors and the slowest speed detected by one of the plurality of wheel speed sensors is less than the threshold for a pre-determined period of time. The controller checks if the speed detected by each of the plurality of wheel speed sensors exceeds a second threshold. The plurality of wheel speed sensors pass the signal check if the controller has not detected interference at the plurality of wheel speed sensors, the speed detected by each of the plurality of wheel speed sensors exceeds the second threshold, and the difference between the fastest speed detected by one of the plurality of wheel speed sensors and the slowest speed detected by one of the plurality of wheel speed sensors is less than the threshold for the pre-determined period of time.

In some embodiments, the previously-detected vehicle wheel speed sensor malfunction is a wheel speed sensor swapped sensor fault. The signal check is executed only when the vehicle is turning. The controller determines that the vehicle is turning if an absolute value of a yaw rate of the vehicle is greater than a threshold. The controller calculates a wheel speed sensor yaw rate and a lateral acceleration yaw rate. The wheel speed sensor passes the signal check if the difference between the wheel speed sensor yaw rate and the lateral acceleration yaw rate is less than a second threshold for a pre-determined period of time.

In some embodiments, the previously-detected vehicle wheel speed sensor malfunction is a wheel speed sensor missing teeth fault. The controller monitors a signal from the wheel speed sensor and is configured to detect one or more missing teeth in the wheel speed sensor. The wheel speed sensor passes the signal check if the controller does not detect the one or more missing teeth for a pre-determined period of time.

Other aspects of the invention will become apparent by consideration of the detailed description and accompanying drawings.

DETAILED DESCRIPTION

Figure 1:
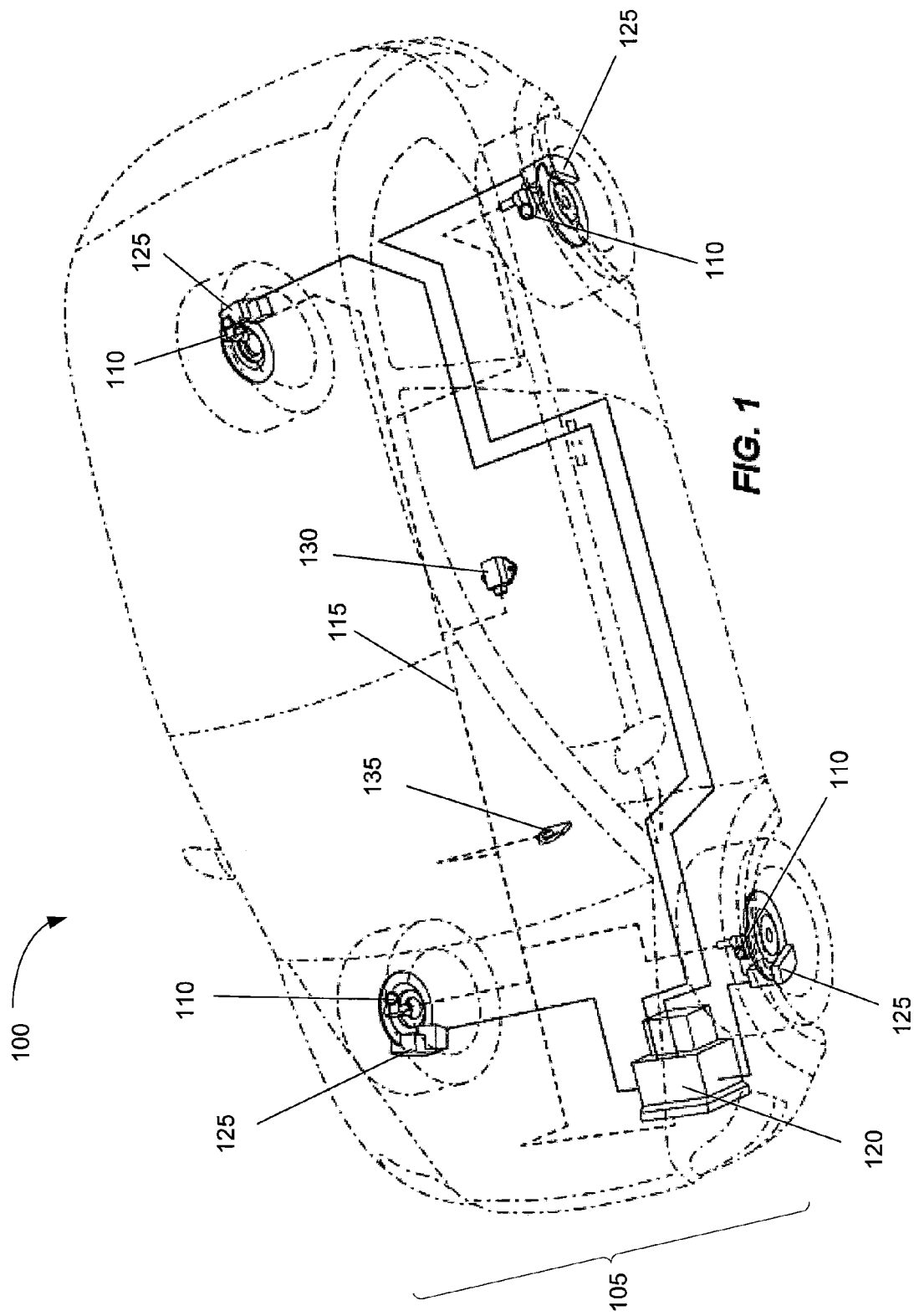
FIG. 1 is a perspective view of a vehicle including a vehicle control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components, may be utilized to implement the invention. Further, and as described in subsequent paragraphs, the specific configurations illustrated in the drawings are intended to be exemplary embodiments of the invention. Alternative configurations are possible.

FIG. 1 illustrates a vehicle 100 including vehicle control system 105. In the example illustrated the vehicle control system is an electronic stability control ("ESC") system. The vehicle control system 105 includes a plurality of wheel speed sensors ("WSS") 110. Each of the WSS's 110 monitor a single wheel of the vehicle and are connected to the bus 115.

Each WSS 110 provides information about the speed of rotation of the wheel it monitors. Information obtained by the WSS 110 is transmitted over a connection or network, such as a controller area network ("CAN") bus 115. A controller 120 receives information from the WSS 110 via the bus 115. The controller 120 includes an ESC application or module that is designed to detect instability of the vehicle and help correct the situation. For example, when the controller 120 detects a loss of steering control, the controller 120 may automatically apply one or more individual brakes 125 to help steer the vehicle 100 in a desired direction. In some embodiments, the controller 120 also reduces engine power when it detects a skid or slide of the vehicle 100 until the vehicle operator regains control of the vehicle 100.

As shown in FIG. 1, the vehicle control system 105 also includes additional sensors such as a yaw rate sensor ("YRS") 130, and a steering angle sensor ("SAS") 135. The YRS 130 is connected to the bus 115 and sends information to other components also connected to the bus 115, such as the controller 120. Information sent by the YRS 130 over the bus 115 includes information about the rotational velocity of the vehicle around a vertical axis at the center of the vehicle. The SAS 135 senses how far and in what direction a steering wheel has been turned, transmitting this data over the bus 115.

Figure 2:
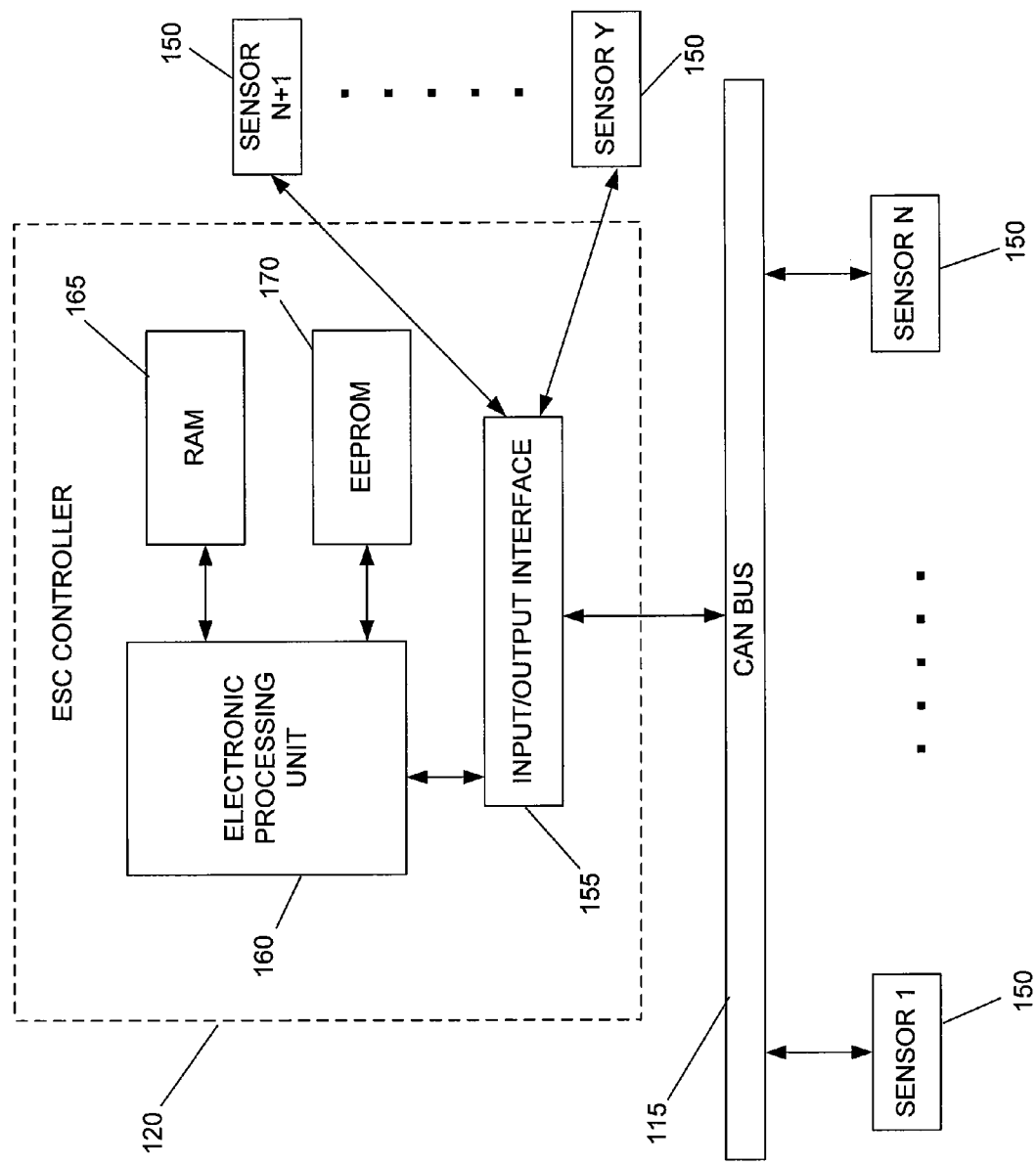
FIG. 2 schematically illustrates the vehicle control system of FIG. 1 according to one embodiment of the invention.

FIG. 2 schematically illustrates the vehicle control system 105 of FIG. 1 in greater detail. The numerous sensors depicted in FIG. 1 are represented generally by boxes 150 (Sensor 1 . . . Sensor N). The control system 105 includes the controller 120 and the bus 115. The controller 120 includes an input/output interface 155, an electronic processing unit ("EPU") 160, and one or more memory modules, such as a random access memory ("RAM") module 165 and an electronically erasable programmable read-only memory ("EEPROM") module 170. As shown in FIG. 2, the input/output interface 155 transmits and receives information over the bus 115. The EPU 160 receives the information from the input/output interface 155 and processes the information by executing one or more applications or modules. The applications or modules can be stored in the memory. The EPU 160 also stores information (e.g., information received from the bus 115 or information generated by applications or modules executed by the EPU 160) to the memory. Data stored in the RAM 165 is reset at the start of each new ignition cycle.

Figure 3:
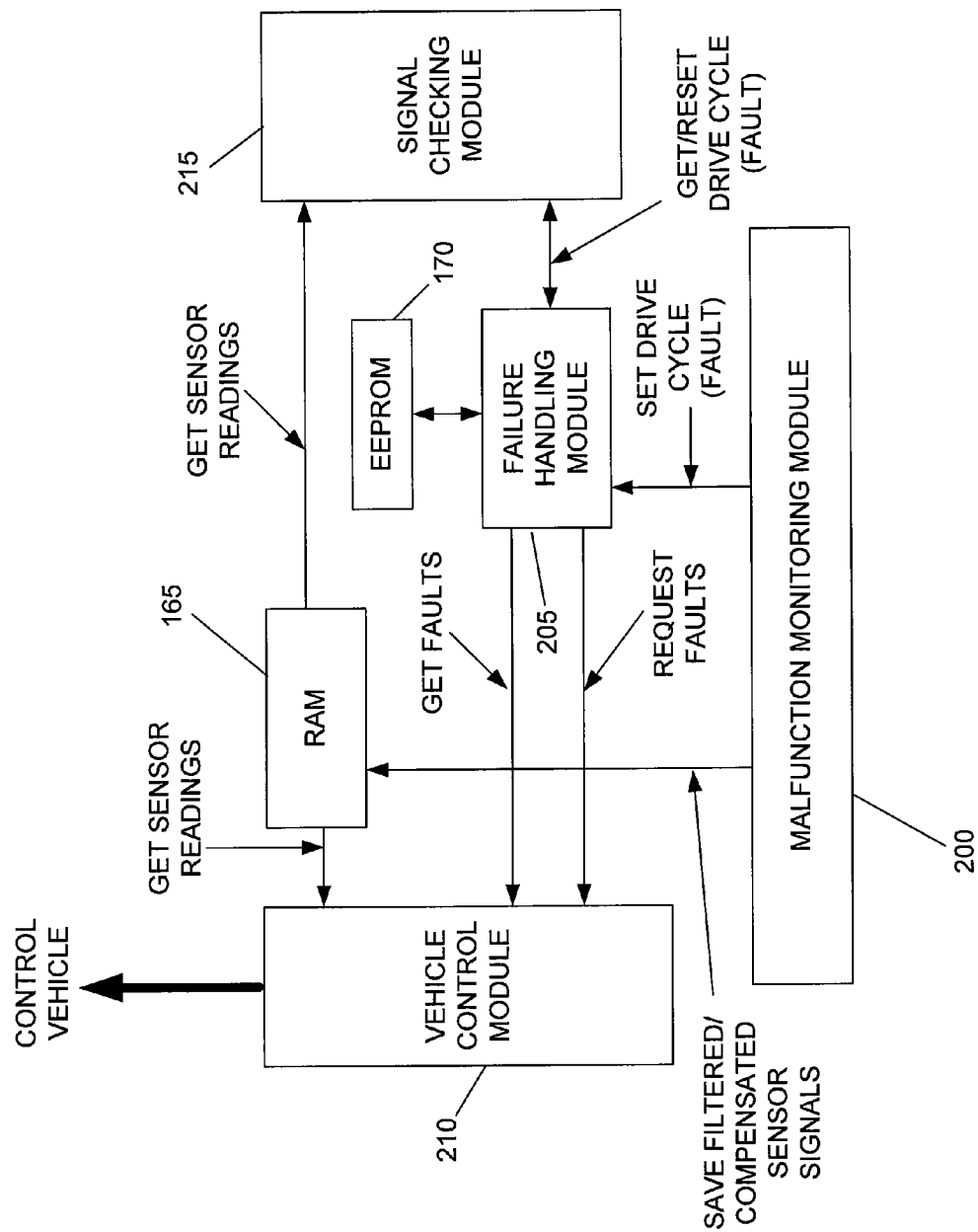
FIG. 3 schematically illustrates the functional operation of modules of the vehicle control system of FIG. 2 according to one embodiment of the invention.

In the embodiment illustrated in FIG. 3, the EPU 160 includes a malfunction monitoring module 200, a failure handling module 205, a vehicle control module 210, and a signal checking module 215. The malfunction monitoring module 200 receives sensor signals from the sensors 150 (e.g., through the input/output interface 155) and saves the sensor signals to the memory. In most embodiments, the malfunction monitoring module 200 saves filtered or compensated sensor signals to the memory. In addition, the malfunction monitoring module 200 can save raw sensor data to the memory. For example, over time a sensor 150 may become dirty or damaged, which can affect the sensor's operation. The malfunction monitoring module 200 applies an offset (positive or negative) to the signals received from a particular sensor 150 to compensate for the sensor's deterioration, and stores the compensated sensor signal to the memory.

The main function or purpose of the malfunction monitoring module 200 is to determine if a particular sensor is malfunctioning or faulty. For example, if a sensor's offset becomes too large, the malfunction monitoring module 200 may determine that the sensor 150 is no longer reliable, and therefore is malfunctioning. A variety of algorithms and techniques for determining whether a sensor is malfunctioning can also be used, including those disclosed in U.S. Pat. No. 6,834,221.

When the malfunction monitoring module 200 detects a malfunctioning or faulty sensor, the module 200 generates a fault signal and sends the fault signal to the fault handling module 205. The fault signal includes fault information based on the particular fault or malfunction observed by the malfunction monitoring module 200. The failure handling module 205 stores the fault information and corresponding counter information, (which is referred to as "drive cycle information") in the memory. The drive cycle information indicates what signal check functions should be performed by the signal checking module 215 during the next drive cycle (e.g., the next time during which malfunction testing is performed) to determine whether a previously-detected fault still exists. For example, if the malfunction monitoring module 200 detects that a WSS 110 is malfunctioning and generates a fault signal, the fault or failure handling module 205 saves drive cycle information to the memory, indicating that the signal checking module 215 should check the WSS 110 during a subsequent cycle to determine whether the previously-detected WSS fault still exists.

Based on faults detected by the malfunction monitoring module 200, the vehicle control module 210 activates one or more warning lights or tell-tales in the vehicle 100 (e.g., on the vehicle's dashboard or instrument panel) that alert the vehicle operator that there is a problem. The vehicle control module 210 may also modify its operation of a particular control system or process, such as ESC functions. For example, if a particular sensor 150 is malfunctioning, the vehicle control module 210 may change the operation of an ESC function from a first operating state (e.g., fully functional and active) to a second operating state (e.g., partial functionality or inactive). In some embodiments, the first operating state includes fully active and functional control where the vehicle control module 210 considers all data from all sensors 150 providing vehicle information relevant to a particular ESC function. The second operating state can include an intermediate functional state where the vehicle control module 210 ignores sensor information from one or more particular malfunctioning sensors, but continues to perform ESC functions using data from other functioning sensors or constants (e.g., when data necessary to perform particular ESC functions cannot be derived from other sensors 150). Alternatively, the second operating state can include a deactivated state. In some embodiments, the vehicle control module 210 can deactivate one or more ESC functions if a sensor 150 important to that function is malfunctioning and, thus, causing a lack of proper information for the ESC to function properly. If the vehicle control module 210 inactivates one or more ESC functions, or other types of vehicle control or monitoring functionality, the vehicle control module 210 activates one or more warning lights or tell-tales that warn the vehicle operator of the modified operating state.

When ESC functions are operational (e.g., the vehicle control module 210 is monitoring for oversteer and understeer conditions), the vehicle control module 210 obtains current sensor readings from the memory. In some embodiments, the vehicle control module 210 may also or alternatively obtain current sensor readings from the malfunction monitoring module 200, the bus 115 and/or one or more sensors 150 directly (e.g., via the input/output interface 155). If the vehicle control module 210 is ignoring particular sensor information, based on currently detected faults, the vehicle control module 210 does not need to request this sensor information or can simply ignore any such sensor information it receives.

The signal checking module 215 performs various signal checks to determine whether a previously-detected sensor malfunction still exists. As shown in FIG. 3, as part of a signal check, the signal checking module 215 retrieves drive cycle information stored in the memory. In some embodiments, the signal checking module 215 is initialized during each new ignition cycle, and retrieves the stored drive cycle information upon each initialization. In other embodiments, the signal checking module 215 retrieves stored drive cycle information from the memory at various times while the controller 120 is operating, and the signal checking module 215 performs signal checks based on the stored drive cycle information continuously or at designated times (e.g., a next ignition cycle, or once every 10 milliseconds).

As described below with respect to FIGS. 4-6, after the signal checking module 215 retrieves stored drive cycle information from the memory, the module 215 executes one or more signal check functions to determine whether a previously-detected fault still exists. As part of executing signal check functions, the signal checking module 215 retrieves current sensor readings from the memory (as stored by the malfunction monitoring module 200). In other embodiments, the signal checking module 215 can retrieve current sensor information or readings from the malfunction monitoring module 200 the bus 115 and/or one or more sensors 150 directly (i.e., via the input/output interface 155). The current sensor readings can include compensated or filtered sensor signals or information, raw sensor information, current sensor offsets, and/or other statistical information about a particular sensor 150. The signal checking module 215 uses the current sensor readings when executing a signal check function to determine whether the previously-detected fault still exists. In some embodiments, the signal checking module 215 retrieves current sensor readings from the previously-detected malfunctioning sensor. In other embodiments, the signal checking module 215 also retrieves current sensor readings from sensors other than the previously-detected malfunctioning sensor. For example, the signal checking module 215 can use information from functioning sensors to determine whether a sensor reading from a sensor 150 having a previously-detected fault is implausible.

As shown in FIG. 3, if the signal checking module 215 performs one or more signal check functions related to a particular fault and determines that the fault doesn't exist anymore, the signal checking module 215 can reset the corresponding fault information and/or drive cycle information in the memory to indicate that the previously-detected malfunction no longer exists. In some embodiments, the signal checking module 215 resets the drive cycle information by generating a reset signal. The failure handling module 205 receives the reset signal and updates the fault information and/or drive cycle information in the memory to indicate that the previously-detected fault no longer exists (e.g., by deleting the previous fault and/or drive cycle information or setting a fault bit or flag to an "okay" or "no fault" value). When the vehicle control module 210 subsequently requests the current faults from the failure handling module 205, the failure handling module 205 informs the vehicle control module 210 that the sensor 150, for which there was a previously-detected fault, is functioning properly. The vehicle control module 210 re-assesses the current faults and, in some embodiments, deactivates a previously-activated warning light or tell-tale within the vehicle 100 and/or returns its operation back to a first or original operating state (e.g., a fully active and functional state).

If the signal checking module 215 performs one or more signal check functions related to a particular fault and determines that the fault still exists, the signal checking module 215 does not change the corresponding fault and/or drive cycle information in the memory, which retains the fault and/or drive cycle information in the same condition as before the signal checking module 215 performed the required signal checks.

Particular sensors 150 can experience various malfunctions. For example, the plurality of WSS's 110 may experience a WSS stuck signal malfunction, which occurs when the malfunction monitoring module 200 detects that the WSS signal remains constant for a predetermined period of time or when other detected (i.e., measured or calculated) yaw rates have changed. As described above, when the malfunction monitoring module 200 detects a WSS stuck signal malfunction, the module 200 generates a fault signal and the failure handling module 205 stores corresponding fault information and drive cycle information in the memory. The vehicle control module 210 obtains the current fault information from the failure handling module 205 and activates one or more telltales or warning lights and/or modifies operation of a vehicle control (e.g., deactivating ESC function(s)).

The malfunction monitoring module 200 can detect other WSS malfunctions in addition to the WSS stuck signal malfunction, including a WSS swapped signal malfunction, a WSS implausible sensitivity malfunction, a WSS interference malfunction, and a WSS missing teeth malfunction. FIGS. 4-6, illustrate embodiments of methods for determining if previously-detected faults of these types no longer exist.

Figure 4:
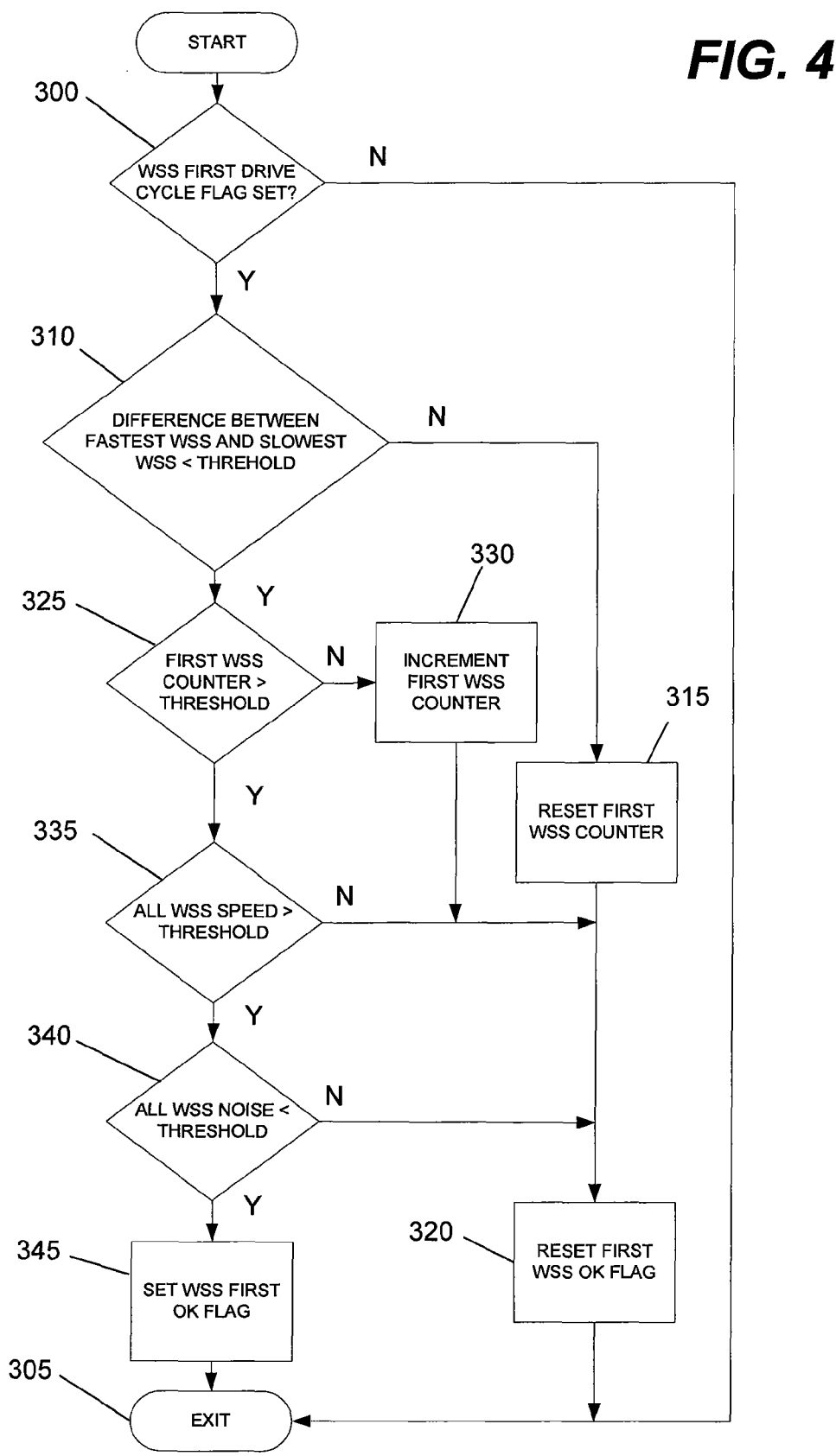
FIG. 4 is a flow chart illustrating a first wheel-speed-sensor signal check function according to an embodiment of the invention.

FIG. 4 shows an embodiment of the operation of the signal checking module 215 for detecting if a previously-detected first (or generic) WSS error still exists. When the malfunction monitoring module 200 determines that a first WSS fault has occurred, the malfunction monitoring module 200 sets a first WSS drive cycle flag. The signal checking module 215 performs checks on previously-detected faults (e.g., continuously or once each pre-determined time period). One of the checks the signal checking module 215 performs is a first WSS signal check. The signal checking module 215 begins by checking if the first WSS drive cycle flag is set (step 300). If the first WSS drive cycle flag is not set (i.e., a first WSS fault has not been detected), the signal checking module 215 exits the first WSS signal check (step 305).

If, at step 300, the first WSS drive cycle flag is set (i.e., a first WSS fault has previously been detected), the signal checking module 215 determines if the first WSS fault no longer exists. Generally, the signal checking module 215 compares the readings of each of the plurality of WSS's 110 to each other when the speed of the wheels is above a threshold. If all the readings are all within a desired range for a pre-determined period, and there was no interference in the signal of any of the WSS's 110, the signal checking module 215 determines that the previously-detected generic fault no longer exists. In some embodiments, individual WSS's 110 can be checked against another WSS 110 to identify an individual WSS 110 that is faulty. Thus, an anti-lock braking system that uses data from the WSS 110 can continue to function normally for wheels having non-faulty speed sensors, while operating in an inactive state for the wheel or wheels having a faulty speed sensor.

Referring back to FIG. 4, the signal checking module 215 determines if the fastest speed detected by one of the WSS's 110 is within an allowable range compared to the slowest speed detected by one of the WSS's 110 (step 310). If the fastest and slowest detected speeds are not within the allowable range (e.g., if the fastest detected speed is greater than the slowest detected speed by more than a threshold such as 0.5% to 30%), the signal checking module 215 resets a first WSS counter (step 315) and a first WSS "OK" flag (step 320), and exits the first WSS signal check (step 305). The first WSS counter tracks the difference between the fastest and slowest detected speeds and determines whether this difference is within the allowable range. The first WSS "OK" flag is used by the controller 120 to reset the first WSS fault and the drive cycle flag.

If, at step 310, the speeds detected by the WSS's 110 are within the allowable range, the signal checking module 215 checks if the detected speeds have been within the allowable range for a pre-determined time period (e.g., 0.5 to 5.0 seconds) (step 325). If not, the signal checking module 215 increments the first WSS counter (step 330), resets the first WSS "OK" flag (step 320), and exits the first WSS signal check (step 305). If the detected speeds have been within the allowable range for the pre-determined time period, the signal checking module 215 checks if all of the speeds detected by the WSS's 110 exceed a threshold (e.g., 0-100 kilometers per hour) (step 335). If they do not, the signal checking module 215 sets the first WSS "OK" flag (step 320) and exits the first WSS signal check (step 305). If the speeds are all above the threshold, the signal checking module 215 then checks if there has been any interference detected at one of the WSS's 110 (step 340). If interference has been detected, the signal checking module 215 sets the first WSS "OK" flag (step 320) and exits the first WSS signal check (step 305). If there has not been any interference, the signal checking module 215 sets the first WSS "OK" flag (step 345), which causes the first WSS fault and drive cycle flags to be reset and allows the ESC functions using data from the WSS's 110 to return to their fully functional operating state, provided there are no other WSS faults. The signal checking module 215 then exits the first WSS signal check (step 305).

In some embodiments, when a WSS fault is detected, one or more tell-tale indicators or warning lights can be illuminated (e.g., using one or more colors such as yellow and/or red) to indicate to a driver the status of various ESC functions (e.g., anti-lock braking) which rely on data from the wheel speed sensors. In addition, the warning lights that are illuminated, and their colors, can be modified based on the number of wheels at which a WSS fault has been detected (e.g., one or two wheels versus three or four wheels in a vehicle having four wheels). The states of the warning lights can indicate to the driver which of the ESC functions are compromised, and which remain operational.

In one exemplary embodiment, when a WSS fault is detected, a brake warning light is off, an ABS warning light is illuminated yellow, an ESC Failure light is also illuminated yellow, and, an ESC off light is off (e.g., the ESC off light is illuminated when the driver manually turns off the ESC functions).

In another exemplary embodiment, when a WSS fault is detected, a brake warning light is illuminated red, an ABS warning light is illuminated yellow, an ESC failure light is also illuminated yellow, and an ESC off light is off.

Figure 5:
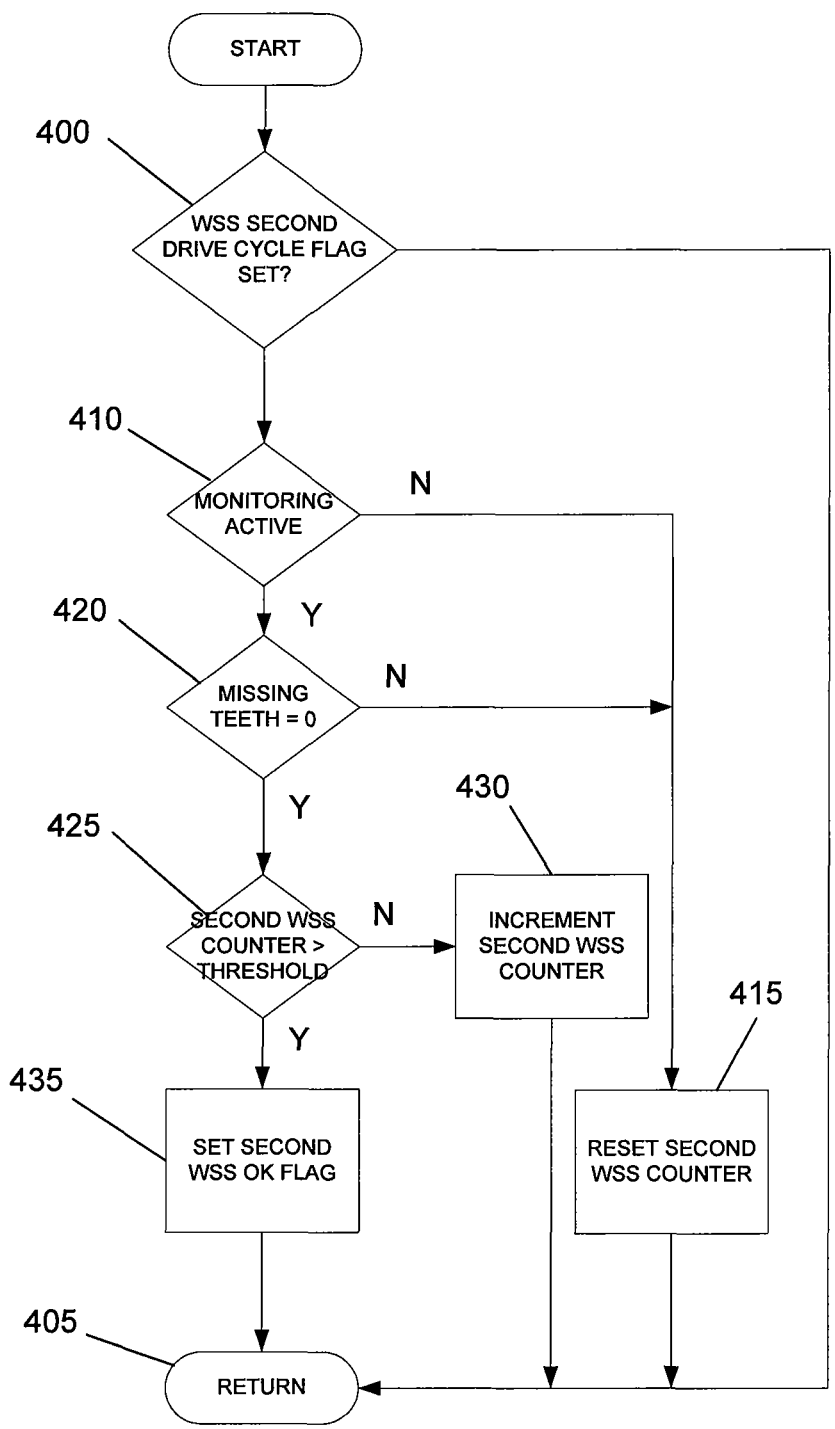
FIG. 5 is a flow chart illustrating a second wheel-speed-sensor signal check function according to an embodiment of the invention.

FIG. 5 shows an embodiment for determining whether a previously-detected second (or missing teeth) WSS fault still exists. In some embodiments, the WSS's 110 include "teeth" (e.g., alternating pole magnets, slots, etc.) on a hub that rotates with a wheel. The "teeth" are detected by a sensor and converted to an output signal—generally a square wave signal having a positive half cycle when a "tooth" is detected. The frequency of the signal then indicates the speed at which the wheel is turning. If a "tooth" is missing or becomes dirty, the output signal will miss the positive half cycle associated with that tooth once each revolution of the wheel. The missing signal can impact the calculation of the wheel speed. The wheel speed missing teeth signal checks are performed for each WSS 110 individually.

When the malfunction monitoring module 200 determines that a second WSS fault has occurred, the malfunction monitoring module 200 sets a second WSS drive cycle flag. The signal checking module 215 performs checks on previously-detected faults (e.g., continuously or once each pre-determined time period). One of the checks the signal checking module 215 performs is a second WSS signal check. The signal checking module 215 begins by checking if the second WSS drive cycle flag is set (step 400). If the second WSS drive cycle flag is not set (i.e., a second WSS fault has not been detected), the signal checking module 215 exits the second WSS signal check (step 405).

If the second WSS drive cycle flag is set, the signal checking module 215 checks if a missing teeth monitoring function is active (step 410). The missing teeth monitoring function may be inactivated during certain circumstances (e.g., during high-bandwidth computing operations such as when an ABS function is operating). If the missing teeth monitoring function is not active, data related to WSS missing teeth is not valid, and should be ignored. As a consequence, if the function is inactive, the signal checking module 215 resets a second WSS counter (step 415) and exits the second WSS signal check (step 405). If monitoring is active, the signal checking module 215 checks whether any missing teeth have been detected (step 420). If one or more missing teeth have been detected (e.g., by checking a flag or counter updated by the missing teeth monitoring function), the signal checking module 215 resets the second WSS counter (step 415) and exits the second WSS signal check (step 405). If, at step 430, no missing teeth were detected, the signal checking module 215 checks if there have been no missing teeth detected for a pre-determined time period (step 425). If the time period that no missing teeth have been detected is less than the pre-determined time period, the signal checking module 215 increments the counter (step 430) (e.g., updates the time that no missing teeth have been detected) and exits the second WSS signal check (step 405).

If there have been no missing teeth detected for the entire pre-determined time period, the signal checking module 215 sets a second WSS "OK" flag (step 435), causing the controller 120 to reset the second WSS fault and drive cycle flags, and allowing the ESC functions using data from the WSS's 110 to return to their fully functional operating state, provided there are no other WSS faults. The signal checking module 215 then exits the second WSS signal check (step 405).

Figure 6:
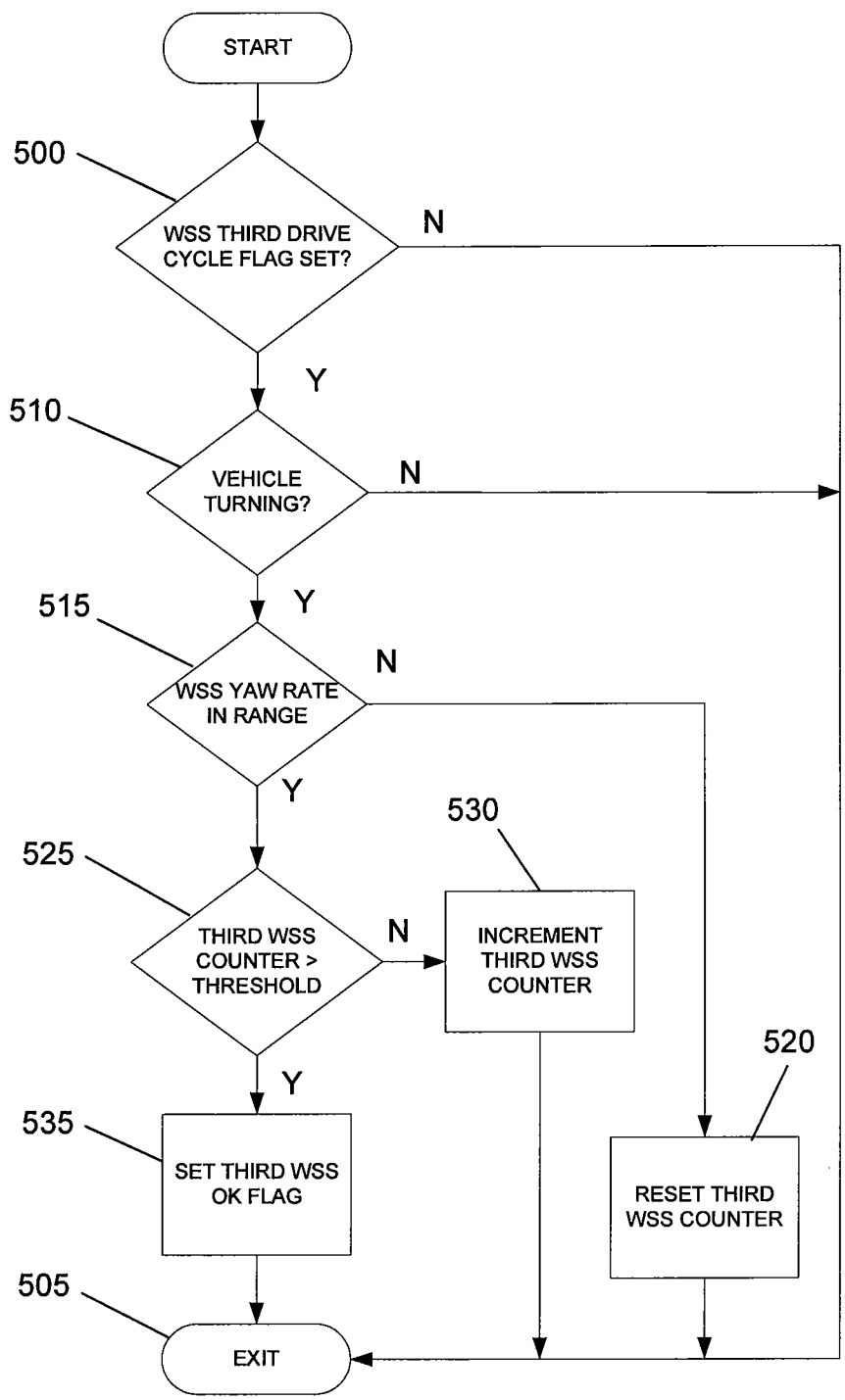
FIG. 6 is a flow chart illustrating a third wheel-speed-sensor signal check function according to an embodiment of the invention.

FIG. 6 shows an embodiment of the operation of the signal checking module 215 for detecting if a previously-detected third (or swapped-sensor) WSS fault still exists. In some circumstances, data from individual WSS can be "swapped." For example, the signals from the WSS associated with a right front wheel can be swapped with the signals from the WSS associated with a left front wheel (e.g., by incorrect wiring or sensor addressing). When the sensors are swapped, the data cannot be relied upon by the ESC controller 120.

When the malfunction monitoring module 200 determines that a third WSS fault has occurred, the malfunction monitoring module 200 sets a third WSS drive cycle flag. The signal checking module 215 performs checks on previously-detected faults (e.g., continuously or once each pre-determined time period). One of the checks the signal checking module 215 performs is a third WSS signal check. The signal checking module 215 begins by checking if the third WSS drive cycle flag is set (step 500). If the third WSS drive cycle flag is not set (i.e., the WSS 110 are not swapped), the signal checking module 215 exits the third WSS signal check (step 505).

If the third WSS drive cycle flag is set, the signal checking module 215 checks if the vehicle is turning (step 510). In some embodiments, the signal checking module 215 determines the vehicle is turning if a yaw rate from the YRS 130 exceeds a threshold (e.g., 2.0 to 10.0 degrees per second). If the vehicle is not turning, the signal checking module 215 exits the third WSS signal check (step 505).

If the vehicle is turning, the signal checking module 215 checks if a yaw rate calculated using data from the WSS 110 is within a pre-determined range relative to a yaw rate calculated using data from a lateral acceleration sensor (step 515). A yaw rate is calculated based on the difference in the detected speed of the right and left wheels for both the front and back axles. For example, if the vehicle is traveling straight, there should be little or no difference between the detected speeds of the right and left wheels. However, if the vehicle is turning, the speed of the wheels on the outside of the turn should be faster than the speed of the wheels on the inside of the turn. If the WSS's 110 are swapped between the right and left wheels of the vehicle, the yaw rate calculated using data from the WSS's would be inverse of the actual yaw rate of the vehicle. In addition, if the WSS's 110 are swapped between the front and back axles, the yaw rates calculated for the front axle and the rear axle would likely be out of proportion. A yaw rate is also determined using the lateral acceleration obtained from a lateral acceleration sensor and the speed of the vehicle. In some embodiments, the yaw rates calculated using data from the WSS's must be within a range (e.g., +/−0.1 to 10.0 degrees per second of the yaw rate calculated using data from the lateral acceleration sensor).

If, at step 515, the signal checking module 215 determines that the yaw rate calculated using data from the WSS 110 is not within the pre-determined range relative to a yaw rate calculated using data from a lateral acceleration sensor, the signal checking module 215 resets a third WSS counter (step 520) and exits the third WSS signal check (step 505). If the yaw rates are within the pre-determined range, the signal checking module 215 checks if the yaw rates have been within the pre-determined range for a pre-determined time period (step 525) (e.g., 1.0 to 10.0 seconds). If the yaw rates have not been within the pre-determined range for the time period, the signal checking module 215 increments the third WSS counter (step 530) (e.g., updates the time that yaw rates have been within the range) and exits the third WSS signal check (step 505).

If the yaw rates have been within the range for the entire time period, the signal checking module 215 sets a third WSS "OK" flag (step 535), causing the controller 120 to reset the third WSS fault and drive cycle flags, allowing the ESC functions using data from the WSS's 110 to return to their fully functional operating state, provided there are no other WSS faults. The signal checking module 215 then exits the third WSS signal check (step 505).

In some embodiments, the failure handling module 205 detects that a WSS "OK" flag has been set by one of the functions described above. The failure handling module 205 then resets the fault and the drive cycle information in the memory for the respective WSS fault. In other embodiments, the signal checking module 215 sends a reset signal to the failure handling module 205 to reset a respective WSS fault that the signal checking module 215 determines no longer exists.

Thus, the invention provides, among other things, a controller for determining whether a previously-detected vehicle sensor malfunction still exists by executing various signal checks and signal check functions using sensor-related information. Various features and advantages of the invention are set forth in the following claims.

What is claimed is:

1. A controller for determining whether a previously-detected vehicle wheel speed sensor malfunction still exists, the controller comprising:
    an electronic, non-volatile memory; and
    an electronic processing unit connected to the electronic, non-volatile memory, the electronic processing module including,
    a malfunction monitoring module that monitors the operation of a wheel speed sensor and generates a fault signal when the wheel speed sensor outputs a signal that is outside of a first predetermined range, the fault signal containing fault information and causing at least one of a tell-tale indicator to be activated and a vehicle control system to modify its operation from a first operating state to a second operating state,
    a failure handling module that causes drive cycle information and the fault information to be stored in the electronic, non-volatile memory, and
    a signal checking module that performs a signal check on information from the wheel speed sensor, the signal check including
    retrieving drive cycle information for a wheel speed sensor from the electronic, non-volatile memory,
    comparing an output of the wheel speed sensor to a second pre-determined range narrower than the first predetermined range, the wheel speed sensor passing the signal check if the output of the wheel speed sensor is within the second pre-determined range for a pre-determined amount of time,
    generating a reset signal, if the wheel speed sensor passes the signal check, the reset signal causing at least one of the tell-tale indicator to be deactivated and the vehicle control system to resume operation in the first operating state.

2. The controller of claim 1, wherein the controller is mounted in a vehicle.

3. The controller of claim 2, wherein the previously-detected vehicle wheel speed sensor malfunction is one of an implausible sensitivity of the wheel speed sensor, an interference of the wheel speed sensor, and a stuck signal received from the wheel speed sensor.

4. The controller of claim 3, wherein the wheel speed sensor is one of a plurality of wheel speed sensors and the controller compares a speed detected by each of the plurality of wheel speed sensors, the malfunction monitoring module determining that a wheel speed sensor fault still exists if the difference between the fastest speed detected by one of the plurality of wheel speed sensors and the slowest speed detected by one of the plurality of wheel speed sensors exceeds a threshold.

5. The controller of claim 4, wherein the signal checking module checks if the difference between the fastest speed detected by one of the plurality of wheel speed sensors and the slowest speed detected by one of the plurality of wheel speed sensors is less than the threshold for a pre-determined period of time.

6. The controller of claim 5, wherein the controller checks if the speed detected by each of the plurality of wheel speed sensors exceeds a second threshold.

7. The controller of claim 6, wherein the plurality of wheel speed sensors pass the signal check if the controller has not detected interference at the plurality of wheel speed sensors, the speed detected by each of the plurality of wheel speed sensors exceeds the second threshold, and the difference between the fastest speed detected by one of the plurality of wheel speed sensors and the slowest speed detected by one of the plurality of wheel speed sensors is less than the threshold for the pre-determined period of time.

8. The controller of claim 2, wherein the previously-detected vehicle wheel speed sensor malfunction is a wheel speed sensor swapped sensor fault.

9. The controller of claim 8, wherein the signal check is executed only when the vehicle is turning.

10. The controller of claim 9, wherein the controller determines that the vehicle is turning if an absolute value of a yaw rate of the vehicle is greater than a threshold.

11. The controller of claim 9, wherein the controller calculates a wheel speed sensor yaw rate and a lateral acceleration yaw rate.

12. The controller of claim 11, wherein the wheel speed sensor passes the signal check if the difference between the wheel speed sensor yaw rate and the lateral acceleration yaw rate is less than a second threshold for a pre-determined period of time.

13. The controller of claim 2, wherein the previously-detected vehicle wheel speed sensor malfunction is a wheel speed sensor missing teeth fault.

14. The controller of claim 13, wherein the controller monitors a signal from the wheel speed sensor and is configured to detect one or more missing teeth in the wheel speed sensor.

15. The controller of claim 14, wheel speed sensor passes the signal check if the controller does not detect the one or more missing teeth for a pre-determined period of time.

* * * * *